(12) United States Patent
Lee et al.

(10) Patent No.: US 6,710,098 B1
(45) Date of Patent: Mar. 23, 2004

(54) METHODS FOR REFORMING POLYMER SURFACE FOR IMPROVED WETTABILITY

(75) Inventors: Sang-Young Lee, Taejeon (KR); Byeong-In Ahn, Taejeon (KR); Heon-Sik Song, Taejeon (KR); Myung-Man Kim, Taejeon (KR)

(73) Assignee: LG Chemical Ltd., Seoul (KR)

( * ) Notice: Subject to any disclaimer, the term of this patent is extended or adjusted under 35 U.S.C. 154(b) by 0 days.

(21) Appl. No.: 09/601,310

(22) PCT Filed: May 15, 1999

(86) PCT No.: PCT/KR99/00244

§ 371 (c)(1),
(2), (4) Date: Jul. 31, 2000

(87) PCT Pub. No.: WO00/32294

PCT Pub. Date: Jun. 8, 2000

(30) Foreign Application Priority Data

Dec. 2, 1998 (KR) ............................................. 98-52484
Apr. 10, 1999 (KR) ........................................ 1999-12643

(51) Int. Cl.⁷ .............................. C08J 3/28; H01M 2/16
(52) U.S. Cl. ....................... 522/161; 522/150; 522/157; 522/162; 522/2; 429/254; 427/496; 427/497
(58) Field of Search ...................... 522/2, 150, 157, 522/161, 162, 158, 159, 160, 109, 110, 111, 112; 429/247; 250/492.21

(56) References Cited

U.S. PATENT DOCUMENTS

| | | | | |
|---|---|---|---|---|
| 3,853,601 A | * | 12/1974 | Taskier | 427/428 |
| 3,996,318 A | | 12/1976 | van Heuven | |
| 4,346,142 A | * | 8/1982 | Lazear | 427/496 |
| 4,376,794 A | * | 3/1983 | Machi et al. | 427/44 |
| 4,845,132 A | * | 7/1989 | Masuoka et al. | 210/490 |
| 4,885,077 A | * | 12/1989 | Karakelle et al. | 204/403 |
| 5,028,332 A | * | 7/1991 | Ohnishi | 210/500.27 |
| 5,049,167 A | | 9/1991 | Castro et al. | |
| 5,282,965 A | * | 2/1994 | Urairi et al. | 210/500.36 |
| 5,473,165 A | * | 12/1995 | Stinnett et al. | 250/492.1 |
| 5,783,641 A | * | 7/1998 | Koh et al. | 523/300 |
| 5,801,350 A | | 9/1998 | Shibuya et al. | |
| 5,900,443 A | * | 5/1999 | Stinnett et al. | 156/272.2 |
| 5,965,629 A | * | 10/1999 | Jung et al. | 156/272.2 |
| 6,162,512 A | * | 12/2000 | Koh et al. | 427/529 |
| 6,300,641 B1 | * | 10/2001 | Koh et al. | 250/492.21 |
| 6,630,518 B1 | * | 10/2003 | Paronen | 521/50.5 |

FOREIGN PATENT DOCUMENTS

| | | |
|---|---|---|
| JP | 2-212527 | 8/1990 |
| JP | 5-045503 | 2/1993 |

* cited by examiner

*Primary Examiner*—Susan Berman
(74) *Attorney, Agent, or Firm*—Nixon Peabody LLP

(57) ABSTRACT

The present invention relates to a method for reforming the surface of polymer, especially to a method for providing hydrophilicity or increasing hydrophobicity by reforming the surface of polymer or polymer membrane. The present invention is a method for reforming the surface of polymer membrane by irradiating it with energized ionic particles under the vacuum condition. The method including the steps of: a) manufacturing polymer membrane, including a surface activated, by inserting polymer membrane into a vacuum chamber, and by irradiating energized ionic particles on the surface of polymer membrane with an ion beam under a high vacuum; and b) manufacturing polymer membrane treated with a reactive gas on the surface of membrane, including the activated surface of step a), by infusing the reactive gas into a vacuum chamber after energized ionic particles of step a) have been irradiated. The methods in the present invention can achieve their objects to reform the surface to provide hydrophilicity of hydrophobicity without deteriorating mechanical properties of the polymer membrane. Additionally, it can also contribute to an improved working environment and readily accommodate mass production techniques because the surface reforming of polymer membrane is a relatively simple technique that does not employ solvents.

16 Claims, 1 Drawing Sheet

METHODS FOR REFORMING POLYMER SURFACE FOR IMPROVED WETTABILITY

BACKGROUND OF THE INVENTION (a) Field of the Invention

The present invention relates to a method for reforming surface of polymer, especially to a method for either providing hydrophilicity or increasing hydrophobicity by reforming a surface of polymer material or polymer membrane.

(b) Description of the Related Art

Polymer membrane is being used widely in various applications such as air purifiers, filter membranes in the water treatment field, electrolysis, separators in batteries, gas exchange membranes, artificial internal organs, beverage purification, enzyme refining, etc.

As separators for batteries, these membranes play a role that isolates an anode from a cathode, and thereby preventing short circuits due to the contact between two electric poles, and at the same time passing an electrolyte or ion. Although separator material itself does not contribute to supplying electrical energy, it does affect the performance and safety of battery by its mechanical characteristics.

There are various required characteristics in a separator of battery that depend on the type of battery and recent varieties of separators have been developed and tried out in secondary, or rechargeable, batteries such as, the lithium battery that requires different characteristics from separators used in conventional batteries.

Basic characteristics required in separators for battery include the ability to isolate the anode and cathode, low electrical resistance for easy passing of electrolyte or ions, superior wettability with electrolyte, adequate mechanical strength for both assembly and use of the battery, the ability to reduce membrane thickness for high density charging, etc. Separator wettability with the electrolyte is especially influential both directly an indirectly on battery production since after the manufacturing of the jelly roll, the process must await the electrolyte to infiltrate into the separator. Therefore, there is much interest in the battery industry with increasing the electrolyte infiltration speed by inducing hydrophilicity into a hydrophobic separator.

Safety features such as shut down characteristics are especially required because highly active organic solvents are used as electrolyte in secondary batteries. Therefore, a new polymeric separator has been developed because cellulose or non-woven fabric used in the conventional batteries could not satisfy the required characteristics of a separator for the above described secondary battery. There are many separators for this purpose which are generally made of polyolefin resin. Lithium ion batteries in particular could be commercialized by using polyolefin resin, which is the only material which has a low reactivity with highly active organic solvents and a low price.

Methods for manufacturing a ventilating film's precursor film by using polyolefin resin include a wet process where filler or wax and solvent are used to extract low molecular weight material forming pores and a dry process where microscopic pores are formed without using any solvents by stretching at low and at high temperatures. The stretching process related with forming of pores in the dry process frequently employs uni-axial stretching and bi-axial stretching methods. Although there are many processes that can be used theoretically or in laboratories, the only methods for separator manufacturing being used commercially are the above described wet and dry processes.

On the other hand, even though polyolefin based resin is frequently used as separator for lithium ion batteries due to various superior physical properties and economic aspects, this material has a disadvantage in that it has a low wettability with electrolyte because of its inherent hydrophobicity. Therefore, there have been many efforts to counteract the hydrophobicity of polyolefin based membranes.

These include a method for treating membrane surfaces using a surfactant developed by the Hoechst Celanese Company of the U.S.A. and methods for chemically bonding monomer or polymer displaying hydrophilicity to membranes as taught in U.S. Pat. Nos. 3,231,530, 3,853,601, 3,951,815, 4,039,440, 4,340,482, etc.

However, these methods have a lot of problems in that various other unfavorable side chemical reactions cause a molecular weight reduction of polymer membrane that reduces the durability of the manufactured membrane. Furthermore, the process used with these methods are so complicated that it is not advantageous in economic and mass production aspects, as well as producing a poor working environment due to the use of solvents.

Efforts to reform the surface of polymer membranes include a method for imparting hydrophilicity by using a corona, or plasma, etc. Methods for grafting a hydrophilic monomer such as acrylic acid and polymers such as polyethylene oxide to the membrane surface are taught in the U.S. Pat. Nos. 4,346,142, 5,085,775, and 5,294,346. Additionally, a method for plasma treating or sputter etching while at the same time infusing into the membrane surface an oxygen and carbon tetrafluoride ($CF_4$) gas for alkali secondary battery separators that require hydrophilicity together with hydrophobicity in the battery's discharge characteristics is taught in Japanese Laid-open Patent No. Heisei 8-31399. However, the methods using these plasmas have problems in that control of uniformity is difficult due to plasma's inherent characteristics of high dependence on external environmental factors, broad energy distribution, etc., as well as the surface may be damaged mechanically due to other side reactions degrading mechanical properties. In other words, the critical physical properties required in a membrane are difficult to achieve using plasmas.

On the other hand, a method for reforming the polymer surface including reducing a contact angle or increasing an adhesion strength of the polymer surface by irradiating it with energized ion particles under vacuum conditions on the polymer surface while at the same time infusing reactive gas into the polymer surface is presented in Korean Laid-open Patent Publication No. 96-37742. This method reports that the contact angle of the polymethylmethacrylate (PMMA) is decreased to 8° among the polymers with reformed surfaces, and the contact angle of polycarbonate can be reduced to such a degree that water drops continue to flow, thus making it impossible to measure a contact angle.

However, this method of irradiating ion beams while at the same time infusing a reactive gas is affected by the species of the infused gas selected and the supply of the gas. Furthermore, there are problems in that physical properties of the material, especially the mechanical properties, can deteriorate because the polymer surface can be etched by ancillary ionizations of the coexisting reactive gas in addition to free radical formations on the polymer surface during the ion beam irradiation. Compared to gases used with ion beam, ionized reactive gases are generally known to deepen the degree of etching on a surface during ionization. These phenomena tend to particularly occur more frequently on the surfaces of membranes which can be damaged relatively more easily compared to other materials.

SUMMARY OF THE INVENTION

Therefore, it is an object of the present invention considering problems of the conventional technologies to provide a method for reforming the surface of polymer or polymer membrane without deteriorating the mechanical properties of the polymer or the polymer membrane.

It is other object of the present invention to provide a method for reforming polymer or polymer membrane which has a good working environment and is readily applied in mass production techniques owing to easy surface reforming of polymer or polymer membrane without using any solvents.

It is another object of the present invention to provide a method for manufacturing polymer membrane which is used as lithium ion secondary battery separator having good wettability.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1:
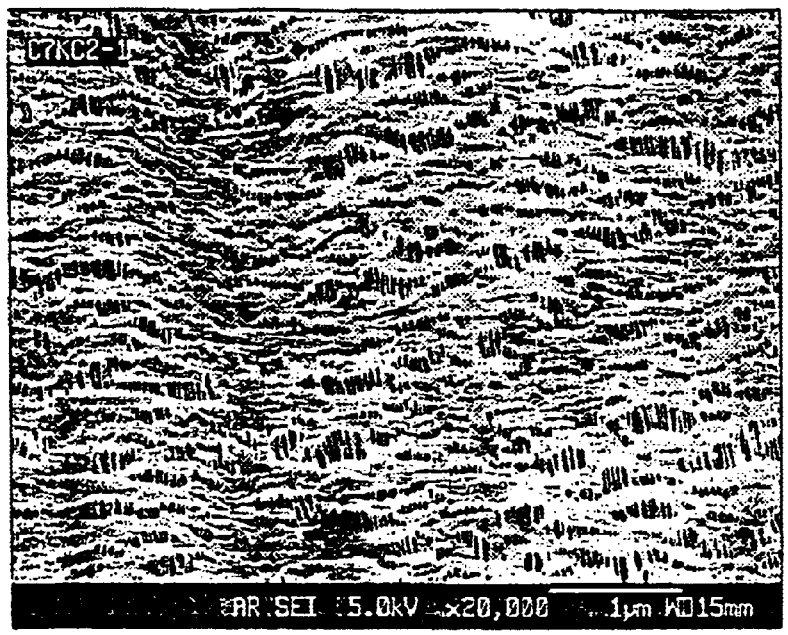
FIG. 1 is a scanning electron microscope (SEM) photograph showing the surface of polyethylene membrane before its surface is treated by irradiation with hydrogen ionic particles of example 1.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention as the first method to achieve the above described objects provides a method for reforming surface of polymer membrane wherein energized ion particles are irradiated on surface of polymer membrane under a vacuum condition.

The above described method is a new method to improve wettability of polymer membrane by striking ion particles on the surface of polymer membrane to change the morphology of the surface, i.e., to cause a physical transformation or roughness change by a size and shape change of the pores of the surface membrane.

Furthermore, the present invention is a method for improving hydrophilicity of polymer film by striking ion particles on the surface of polymer film to change surface roughness.

After polymer membrane or polymer film is put into a vacuum chamber under a high vacuum condition, ion generating gas is infused into an ion gun to produce energized ionic particles, and then the ionic particles are irradiated one side or both sides of the polymer surface to complete the above described method. Power equipment connected to the ion gun is adjusted and particles have available energy of $10^{-2}$ to $10^7$ kilo electron volts (keV).

Pore size of the polymer membrane surface irradiated by the ion beam can be changed or the roughness of polymer membrane surface can be altered depending on the types of irradiated ion and the nature of the irradiation. This will result in reduced contacting angles for various solvents.

For general polymer films without any pores, changes to surface roughness reduce the contacting angles of various solvents.

The types of energized ionic particles of the present invention are one or more of types of particles selected from a group comprising of electrons, hydrogen, oxygen, nitrogen, helium, fluorine, neon, argon, krypton, air, and $N_2O$.

The irradiation of ion particles of the present invention is preferably performed after the formation of pores in the case of polymer membranes using a wet process, and preferably any time before, in the middle, or after the stretching process forming pores in the case of a dry process. The irradiation time is determined depending on the intended use of the polymer film.

A second method also provides a method for reforming the surface of polymer membrane that includes the steps of:

a) manufacturing a polymer membrane including the activated surface by inserting a polymer membrane into vacuum chamber and by irradiating energized ionic particles on the surface of polymer membrane under a high vacuum with an ion beam; and b) manufacturing a polymer membrane treated with a reactive gas reacted on a surface of polymer membrane, including the activated surface of the above step a) by infusing the reactive gas after irradiation by the energized ionic particles.

The above described method can either produce a polymer surface that displays hydrophilicity or increased hydrophobicity, depending on the nature of the reactive gas.

In the above described method, the ion beam irradiation of step a) and the reactive gas infusion of step b) are each separate but performed in series. The reaction with reactive gas after step a) is made in a vacuum chamber and the activated polymer membrane can then be moved into other sealable reaction chamber. One particular example of these is to infuse gas into two reaction chambers which have been connected together while at the same time film is moved from one chamber to the other.

Energized ionic particles of the above described step a) can be irradiated on either one side or both sides of polymer membrane.

The types of ionic particles of the above described step a) can be one or more types of particles or their compounds selected from a group comprising of electrons, hydrogen, oxygen, nitrogen, helium, fluorine, neon, argon, krypton, air, and $N_2O$. In fact, any other ion particles can also be used.

The amount of irradiation of energized ion particles in the above described step a) is preferably $10^5$ to $10^{20}$ ion/cm$^2$, with its energy volume is preferably from $10^{-2}$ to $10^7$ keV, and the high vacuum of the above described step a) is preferably $10^{-2}$ to $10^{-8}$ torr.

The polymer membrane, including the activated surface, of the above described step a) is the membrane where radicals are formed at the surface of polymer by irradiation of energized ion particles.

The reactive gas of the above described step b) is preferably infused when pressure in vacuum chamber reaches the range of $10^{-6}$ to $10^4$ torr. At this time, the infusion rate of the reactive gas is preferably 0.5 to 1000 ml/min and the reactive gases can be used by selecting more than one gases from a group comprising helium, hydrogen, oxygen, nitrogen, air, ammonia, carbon monoxide, carbon dioxide, carbon tetrafluoride, methane, $N_2O$, and their mixtures. In fact, all other gases can also be used.

The material of the polymer membrane which can be applied to the above described method is selected from a polyolefin group comprising polypropylene, high density polyeyhlene (HDPE), low density polyethylene (LDPE), and linear low density polyethylene (LLDPE), and is preferably one or more polyolefin blends or polyolefin laminates selected from this polyolefin group.

The precursor films are put into a vacuum chamber having a high vacuum, ion generating gas is infused into ion gun to produce energized ions, and energized particles are irradiated on one side or both sides of polymer membrane by changing the current of ion beam. This ion beam is irradiated on the polymer membrane in order to form free radicals at the polymer surface. After free radicals are formed by the ion beam irradiation, immediately reactive gas is infused around membrane. Polar or non-polar groups of reactive gas react with free radical of the polymer membrane surface to provide hydrophilicity or increase hydrophobicity characteristics to the surface of polymer membrane.

By controlling power equipment associated with the above described ion gun, the energy of energized particles is adjusted in the range of 0.01 to 100 keV, the infusion rate of the reactive gas is preferably maintained in the range of 0.5 to 1000 ml/min, and the pressure of the vacuum chamber after the infusion of reactive gas is preferably kept in the range of $10^{-6}$ to $10^4$ torr.

The reforming level of the polymer membrane surface of the above described method varies with the irradiation of the ion particles and the variation of the reactive gas parameters including the gas infusion rate and the infusion amount (e.g., pressure in vacuum chamber).

The above described reactive gas is preferably infused without interfering with the irradiation of ion particles in the previous step.

Irradiation of a conventional ion beam while simultaneously infusing reactive gas can cause reactive gas ionized by bombardment with ion beam, and the surface of polymer membrane can hence be damaged by ionization of reactive gas, etc. However, the surface of polymer membrane can be reformed without deteriorating its mechanical properties if the reactive gas is infused in after the completion of ion irradiation as in the above described method.

The polymer membrane manufactured in accordance with the above described two methods can be used as a battery separator, and is especially suitable as a separator for lithium ion secondary batteries or alkali secondary batteries.

By using the above described methods, a surface reformed polymer membrane can be produced relatively easily, and this work can be done under a relatively good manufacturing environment as solvents are not used. Additionally, this method is easily adapted to a mass production process.

The above described methods can be applied to all kinds of polymer products in addition to a polymer membrane (such as to polymer films) and have good surface reforming characteristics either because the surface roughness is changed by ion beam irradiation without affecting the matrix of polymer itself or because the reactive gas is reacted on the polymer surface activated by ion beam irradiation resulting in the polymer displaying either hydrophilicity or hydrophobicity.

The present invention is explained in detail by the following examples and comparative examples. However, examples are for illustrating the present invention, and not for limiting the present invention.

In the below described examples and comparative examples, the surface reformed polymer membranes were tested for the following characteristics:
 a) tensile strength and tensile modulus: American Society for Testing and Materials (ASTM) D882,
 b) puncture resistance,
 c) water absorption speed: Japanese Industrial Standard (JIS) L-1096,
 d) contact angle for electrolyte (mixed solution of ethylene carbonate and dimethyl carbonate).

EXAMPLE 1

After a polyethylene separator manufactured by a dry process was put into a vacuum chamber maintained under the condition of $10^{-4}$ torr, hydrogen ion particles ($H_2^+$) were irradiated on both sides of membrane using an ion gun, wherein the energy of the ion beam was 500 eV and the dose of ion irradiation was $5\times10^{14}$ ions/cm$^2$. The obtained microporous membrane had a 4.2 second water absorption rate and with a mixture of ethylene carbonate (EC) and dimethyl carbonate (DMC), and showed good wettabilities with electrolyte No. 1 having mixing weight % of ethylene carbonate (EC): dimethyl carbonate (DMC) of 4:6, electrolyte No. 2 having mixing weight % of 5:5, and electrolyte No. 3 having mixing weight % of 6:4. Furthermore, the contact angle could not be measured on electrolyte No. 3 showing the greatest polar intensity because the electrolyte solution had permeated into the membrane, which means that the membrane was fully wetted with electrolyte solution.

Figure 2:
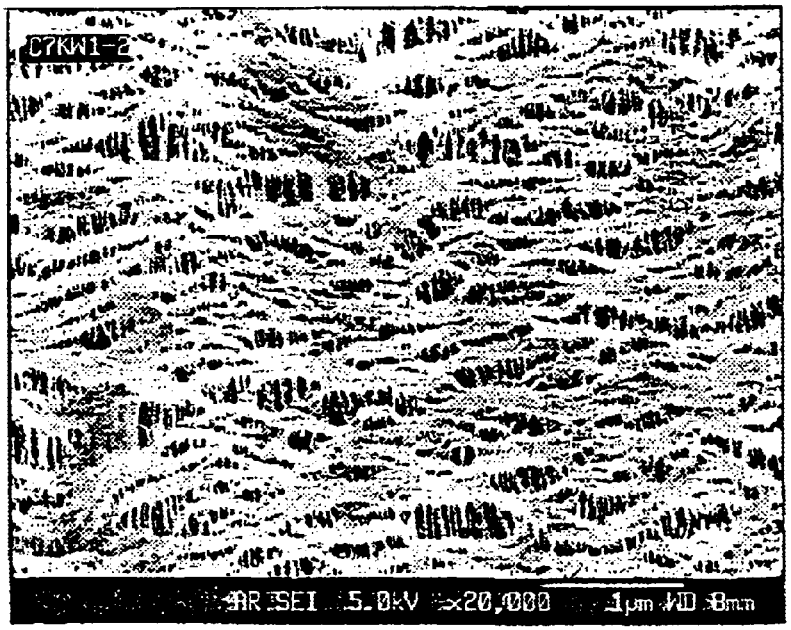
FIG. 2 is a scanning electron microscope (SEM) photograph showing the surface of polyethylene membrane after its surface is treated by irradiation with hydrogen ionic particles of example 1.

A scanning electron microscope (SEM) photograph showing the surface of the polyethylene membrane before its surface was irradiated by hydrogen ionic particles is presented in FIG. 1 and a scanning electron microscope (SEM) photograph showing the surface of the polyethylene membrane after its surface was irradiated by hydrogen ionic particles is presented in FIG. 2. From these photographs it is observed that the surface of this polyethylene membrane was coarser after irradiation and that the size of microscopic pores had increased a little.

EXAMPLE 2

After a polyethylene separator manufactured by a wet process was put into a vacuum vat maintained under the condition of $10^{-4}$ torr as in example 1, hydrogen ion particles ($H_2^+$) were irradiated on both sides of membrane using an ion gun, wherein the energy of the ion beam was 400 eV and the amount of ion irradiation was $1\times10^{15}$ ions/cm$^2$. The obtained microscopic pore membrane had a 2.5 second water absorption rate. The wettability test on the three electrolytes of electrolyte No. 1, electrolyte No. 2, and electrolyte No. 3 as in example 1 all showed good wettabilities. Furthermore, the contact angle could not be measured on electrolyte No. 3 showing the greatest polar intensity because the electrolyte solution had permeated into the membrane, which means that membrane was fully wettted with electrolyte solution.

EXAMPLE 3

After a 3 layer membrane consisting of a top layer of polypropylene, a middle layer of polyethylene, and bottom layer of polypropylene was put into a vacuum chamber maintained under the condition of $10^{-4}$ torr as in example 1, hydrogen ion particles ($H_2^+$) were irradiated on both sides of membrane using an ion gun, wherein the energy of the ion beam was 900 eV and the dose of ion irradiation was $1 \times 10^{15}$ ions/cm$^2$. The obtained microporous membrane had a 4.8 second water absorption rate. The wettability test on three electrolytes of electrolyte No. 1, electrolyte No. 2, and electrolyte No. 3 as in example 1 all showed good wettabilities. Furthermore, the contact angle could not be measured on electrolyte No. 3 showing the greatest polar intensity because the electrolyte solution had permeated into the membrane, which means that membrane was fully wetted with electrolyte solution.

EXAMPLE 4

After a separator made of a blend of polypropylene and polyethylene was put into a vacuum chamber maintained under the condition of $10^{-\infty}$ torr as in example 1, hydrogen ion particles ($H_2^+$) were irradiated on both sides of membrane using an ion gun, wherein the energy of the ion beam was 900 eV and the dose of ion irradiation was $5 \times 10^{14}$ ions/Cm$^2$. The obtained microporous membrane had a 4.7 second water absorption rate. The wettability test on three electrolytes of electrolyte No. 1, electrolyte No. 2, and electrolyte No. 3 as in example 1 all showed good wettabilities. Furthermore, the contact angle could not be measured on electrolyte No. 3 showing the greatest polar intensity because the electrolyte solution had permeated into membrane, which means that membrane was fully wetted with electrolyte solution.

EXAMPLE 5

After low density polyethylene (LDPE) film having a thickness of 25 μm manufactured by a general blowing process was put into a vacuum chamber maintained under the condition of $10^{-5}$ torr as in example 1, argon ion particles ($Ar^+$) were irradiated on both sides of membrane using an ion gun, wherein the energy of the ion beam was 2 keV and the dose of ion irradiation was $1 \times 10^{12}$ ions/cm$^2$.

The result of measuring the water contact angle on this obtained film showed a value of less than 10°.

Comparative Example 1

The result of measuring the water contact angle on the low density polyethylene (LDPE) film having a thickness of 25 μm manufactured by a general blowing process as in example 5 showed a value of 50°, a value representing of a substance displaying hydrophobicity physical properties.

Comparative Example 2

Polyethylene Microporous Membrane Manufactured by a Dry Process

Physical properties of a polyethylene microporous membrane manufactured by a dry process, which was manufactured by the Hoechst Celanese Company in the U.S.A., are represented in Table 1.

Comparative Example 3

Surface Reforming of Polyethylene Microporous Membrane Manufactured by a Dry Process After a polyethylene microporous membrane manufactured by a dry process, which was manufactured by Hoechst Celanese Company in the U.S.A., was put into a vacuum chamber maintained under the condition of $10^{-5}$ to $10^{-6}$ torr, hydrogen ion particles ($H_2^+$) were irradiated on both sides of membrane using an ion gun while at the same time infusing oxygen as a reactive gas, wherein the energy of ion beam was 0.9 keV, the amount of ion irradiation was $10^\infty$ ions/cm$^2$, and the amount of oxygen gas infusion was 4 ml/min.

The physical properties of the surface reformed microporous membrane are represented in Table 1.

EXAMPLE 6

Surface Reforming of Poyethylene Microporous Membrane Manufactured by a Dry Process After a polyethylene microporous membrane manufactured by a general dry process, which was manufactured by Hoechst Celanese Company in the U.S.A., was put into a vacuum chamber maintained under the condition of $10^{-5}$ to $10^{-8}$ torr, hydrogen ion particles ($H_2^+$) were irradiated on both sides of membrane using an ion gun forming free radicals on both sides of membrane, wherein the energy of ion beam was 1 keV and the dose of ion irradiation was $10^{16}$ ions/cm$^2$.

Oxygen gas was infused immediately after ion beam irradiation through a reactive gas infuser at a rate of 200 ml/min until pressure within a vacuum chamber reached atmospheric pressure.

By subsquently infusing the reactive gas, polar groups including oxygen atoms were introduced on the membrane surface. The physical properties of the surface reformed microporous membrane are represented in Table 1.

Comparative Example 4

Polyethylene Microporous Membrane Manufactured by a Wet Process

Physical properties of polyethylene microsporous membrane manufactured with a general wet process by the Tonen Company of Japan, are represented in Table 1.

EXAMPLE 7

Surface Reforming of a Polyethylene Microporous Membrane Manufactured by a Wet Process After a polyethylene microporous membrane manufactured with a general wet process by the Tonen Company of Japan was put into a vacuum vat maintained under the condition of $10^{-5}$ to $10^{-6}$ torr, hydrogen ion particles ($H_2^+$) were irradiated on both sides of the membrane using an ion gun forming free radicals on both sides of the membrane, wherein the energy of ion beam was 0.7 keV and the dose of ion irradiation was $5 \times 10^{15}$ ions/cm$^2$.

Oxygen gas was infused immediately after ion beam irradiation through a reactive gas infuser at a rate of 100 ml/min until pressure within a vacuum chamber reached atmospheric pressure.

By subsquently infusing the reactive gas, polar groups including oxygen atoms were introduced on the membrane surface. The physical properties of the surface reformed microporous membrane are represented in Table 1.

TABLE 1

| Classification | Comparative Example 2 | Comparative Example 3 | Example 6 | Comparative Example 4 | Example 7 |
|---|---|---|---|---|---|
| Tensile strength (N/m; MD/TD) | 46/15 | 34/10 | 43/14 | 95/105 | 90/95 |
| Tensile modulus (N/m; MD/TD) | 720/659 | 630/570 | 715/650 | 1493/789 | 1385/765 |
| Puncture resistance (g) | 280 | 205 | 276 | 410 | 405 |
| Water absorption Speed (sec) | 6.0 | 3.1 | 2.6 | 3.2 | 1.8 |
| Contact angle on mixed electrolyte having weight % of EC:DMC of 5:5 (°) | 48 | 19 | 12 | 25 | 8 |

As represented in the above described Table 1, it is noticeable that a microporous membrane manufactured by a method for reforming the surface of polymer membrane of the present invention not only shows equal mechanical properties and a faster water absorption rate compared to the microporous membrane which is not treated, but also shows a high surface reforming effect as a hydrophilicity in which the contact angle on the electrolyte is lowered.

Furthermore, surface reforming methods of the present invention, when compared with other methods that greatly deteriorate the mechanical properties of the membrane (such as its tensile strength), display noticeably better membrane surface reforming that imparts hydrophilicity without deteriorating mechanical properties. This is true even when examining comparative examples 3 and 4, which reformed the surface of the polymer membrane by irradiating it with conventional ion particles and simultaneously infusing a reactive gas. This resulted in an increased water absorption rate of the manufactured microporous membrane, and effected the surface hydrophilicity by lowering the contact angle of the electrolyte solution.

The first method of the present invention can improve the wettability of polymer membrane on all kinds of solvents, including water and electrolyte, by irradiating energized particles on the membrane surface of polymer under a vacuum condition without the aid of reactive gas. The wettabilities on various electrolytes are so good that the selection of electrolyte becomes much broader, thus contributing to a large extent to improve assembly and performance when such a treated polymer membrane is used as a separator for lithium secondary battery.

Furthermore, in the second method for reforming the surface of polymer membrane by ion beam irradiation and subsequent reactive gas infusion, this method of the present invention can reform the surface without deteriorating mechanical properties of the polymer membrane while the desired characteristics of the membrane surface reforming (such as hydrophilicity or hydrophobicity) can be obtained by a infused reactive gas.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for providing hydrophilicity or increased hydrophobicity to the surface of a polymer membrane comprising:

a) inserting a polymer membrane into a vacuum chamber and irradiating the surface of the polymer membrane with an ionic beam under a high vacuum, said ionic beam being generated by selectively deriving positively charged ionic particles from an ion source and accelerating the ionic particles with energy; and b) treating the surface-activated polymer membrane obtained in step a) by infusing a reactive gas onto the surface of the polymer membrane to cause reaction of the gas with the polymer membrane surface, wherein the ionic beam irradiation of step a) and reactive gas infusion of step b) are sequentially made.

2. The method in accordance with claim 1, wherein the polymer membrane is a microporous film manufactured either by a dry process where pores are formed by low and high temperature stretching or by a wet process where material of low molecular weight is extracted to form pores.

3. The method in accordance with claim 1, wherein the reactive gas infusion of step b) is made without interference of the ionic particles.

4. The method in accordance with claim 1, wherein the ionic beam of step a) is irradiated on one side or two sides of the polymer membrane.

5. The method in accordance with claim 1, wherein the ionic particles of step a) are produced from one or more ion generating gases selected from the group consisting of hydrogen, oxygen, helium, nitrogen, air, fluorine, neon, argon, krypton, $N_2O$, and their mixture.

6. The method in accordance with claim 1, wherein the dose of irradiation of step a) is from $10^3$ to $10^{20}$ ion/cm$^2$.

7. The method in accordance with claim 1, wherein the energy of ionic particles of step a) is from $10^{-2}$ to $10^7$ keV.

8. The method in accordance with claim 1, wherein the high vacuum of step a) is $10^{-2}$ to $10^{-8}$ torr.

9. The method in accordance with claim 1, wherein the reactive gas of step b) is infused until the pressure of the vacuum chamber reaches the range of $10^{-6}$ to $10^4$ torr.

10. The method in accordance with claim 1, wherein the infusion rate of the reactive gas of step b) is 0.5 to 1000 ml/min.

11. The method in accordance with claim 1, wherein the reactive gases of step b) are one or more gases selected from the group consisting of helium, hydrogen, oxygen, nitrogen, air, ammonia, carbon monoxide, carbon dioxide, carbon tetrafluoride, methane, $N_2O$, and their mixtures.

12. The method in accordance with claim 1, wherein the material of the polymer membrane of step a) is a polyolefin selected from the group consisting of polypropylene, high density polyethylene (HDPE), low density polyethylene (LDPE), and linear low density polyethylene (LLDPE).

13. The method in accordance with claim 1, wherein the material of the polymer membrane of step a) is a polyolefin blend or polyolefin laminate, wherein the polyolefins are selected from the group consisting of polypropylene, high density polyethylene (HDPE), low density polyethylene (LDPE), and linear low density polyethylene (LLDPE).

14. The method in accordance with claim 1, wherein the polymer membrane is a separator for a battery.

15. The method in accordance with claim 14, wherein the battery is a lithium ion secondary battery or an alkali secondary battery.

16. A method for providing hydrophilicity or increased hydrophobicity to the surface of a polymer comprising:

a) inserting a polymer into a vacuum chamber and irradiating the surface of the polymer with an ionic beam under high vacuum, said ionic beam being generated by selectively deriving positively charged ionic particles from an ion source and accelerating the ionic particles with energy; and b) treating the surface-activated polymer obtained in step a) by infusing a reactive gas onto the surface of the polymer to cause reaction of the gas with the polymer surface, wherein the ionic beam irradiation of step a) and reactive gas infusion of step b) are sequentially made.

* * * * *